United States Patent

Dodgen

[15] 3,698,758
[45] Oct. 17, 1972

[54] JACK AND TIE-DOWN SYSTEM FOR A VEHICLE MOUNTED CAMPER

[72] Inventor: John N. Dodgen, Humboldt, Iowa 50548

[22] Filed: July 2, 1971

[21] Appl. No.: 159,237

Related U.S. Application Data

[62] Division of Ser. No. 9,003, Feb. 5, 1970, Pat. No. 3,635,366.

[52] U.S. Cl. ................296/23 MC, 214/515, 254/45
[51] Int. Cl. .................................................B60p 3/32
[58] Field of Search ..296/23 MC, 23, 35.1; 214/515, 214/517; 254/45

[56] References Cited

UNITED STATES PATENTS

| | | | |
|---|---|---|---|
| 3,368,785 | 2/1968 | Weiler | 296/23 MC X |
| 3,532,236 | 10/1970 | Hostetler | 214/515 |

*Primary Examiner*—Philip Goodman
*Attorney*—Zarley, McKee & Thomte

[57] ABSTRACT

A jack and tie-down system for a vehicle mounted camper including a first pair of jacks secured to the lower front corners of the camper and a second pair of jacks secured to the rearward end of the camper. The front jacks each include a vertically movable leg portion extending downwardly therefrom. A U-shaped support member is secured to the lower ends of the two leg portions and extend therebetween. The support member serves as a stand for the front end of the camper when the camper is removed from the vehicle and also provides a means for leveling the camper when it is being used while on the vehicle. The support member extends beneath the vehicle frame and engages the same to serve as a tie-down means for the front end of the camper when the camper is on the vehicle. The second pair of jacks also have a support member extending therebetween which is adapted to engage the vehicle frame to serve as a tie-down means for the rear end of the camper when the camper is on the vehicle. The support member on the second pair of jacks also serves as a stand for the back end of the camper when the camper is removed from the vehicle and serves as a means for leveling the camper when the camper is being used while on the vehicle. In the modified form of the system, the second pair of jacks are pivotally connected to the auxiliary axle and wheel assembly which supports the rearward end of the camper. In the modified form of the embodiment, a support member does not extend between the jacks of the second pair of jacks.

6 Claims, 5 Drawing Figures

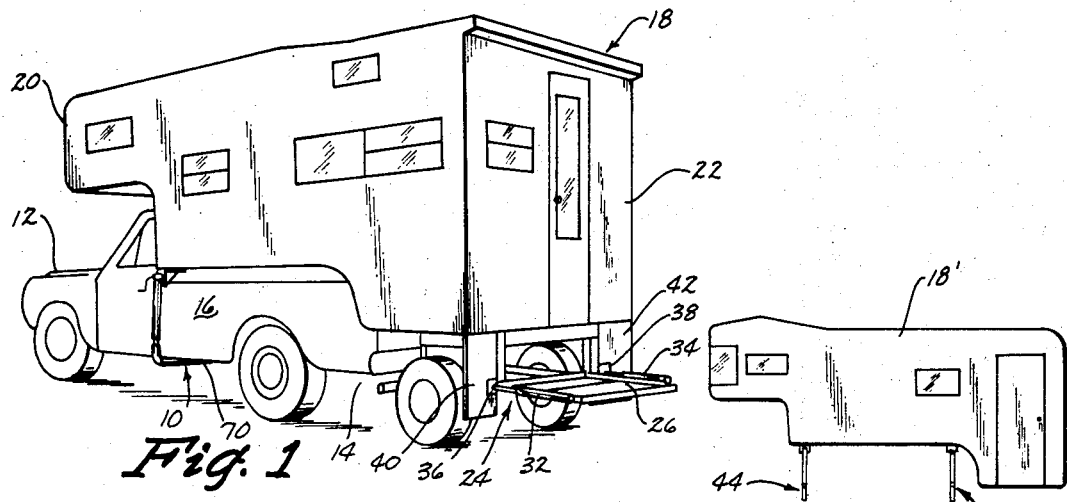

JACK AND TIE-DOWN SYSTEM FOR A VEHICLE MOUNTED CAMPER

This is a divisional application of the application, Ser. No. 9003, having a filing date Feb. 5, 1970, now U.S. Pat. No. 3,635,366.

Conventional vehicle mounted campers usually have a front pair of jacks secured to the front portion of the camper and a rear pair of jacks secured to the rear end of the camper to support the camper when it is removed from the vehicle and to level the camper when it is being used while on the vehicle. These conventional jacks usually have tripod shoes or the like in the lower ends thereof which must be removed and stored when the vehicle is being driven. A separate tie-down system is also needed in the conventional campers to secure the front part of the camper to the vehicle to prevent it from moving with respect to the vehicle when the vehicle is being used on the highway. It has been a common practice to extend a turnbuckle means between the vehicle body and the camper in an attempt to prevent the camper from moving with respect to the vehicle. The use of a turnbuckle means requires that holes be drilled in the vehicle body and camper and is unsatisfactory since the vehicle body has a tendency to bend or slightly move with respect to the vehicle frame. Thus, the camper still bobs, waves or moves on the vehicle due to wind action thereon and also tends to move when the vehicle strikes a bump due to the relative movement of the vehicle body with respect to the vehicle frame. Further, some campers have mud flaps mounted on the rear end thereof which objectionally flap as the vehicle is being driven.

The jack and tie-down system disclosed in the co-pending application is a vast improvement over the conventional camper jack and tie-down systems and the system disclosed herein is a distinct improvement over the invention disclosed in the co-pending application.

Therefore, it is the principal object of this invention to provide a jack and tie-down system for a vehicle mounted camper.

A further object of this invention is to provide a jack and tie-down system for a vehicle mounted camper which prevents the camper from moving with respect to the vehicle frame.

A further object of this invention is to provide a jack and tie-down system for a vehicle mounted camper which provides a roll bar type of production for the camper as well as a brace protection for the vehicle in case of collision or upset.

A further object of this invention is to provide a jack and tie-down system for a vehicle mounted camper which eliminates the need of bolting turnbuckles or clamps to the vehicle bed.

A further object of this invention is to provide a jack and tie-down system for a vehicle mounted camper which permits the camper to be easily leveled.

A further object of this invention is to provide a jack and tie-down system for a vehicle mounted camper which eliminates the necessity of removing tripod shoes from camper jacks when the vehicle is being transported.

A further object of this invention is to provide a jack and tie-down system for a vehicle mounted camper which prevents the camper mud flaps from flapping in the wind.

A further object of this invention is to provide a jack and tie-down system for a vehicle mounted camper which permits the camper to be quickly and easily removed from the vehicle.

A further object of this invention is to provide a jack and tie-down system for a vehicle mounted camper which provides increased stability for the camper when it is being supported on the ground.

A further object of this invention is to provide a jack and tie-down system for a vehicle mounted camper which is durable in use, refined in appearance and economical to manufacture.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a rear perspective view of a camper mounted on a vehicle with the apparatus of this invention secured thereto, the vehicle including an auxiliary axle and wheel assembly.

FIG. 2 is a view similar to FIG. 1 except that the camper has been removed from the vehicle.

FIG. 3 is a rear perspective view of the jack and tie-down system of this invention.

FIG. 4 is an enlarged sectional view as seen along lines 4—4 of FIG. 3.

FIG. 5 is a side view illustrating the jack and tie-down system for a camper which does not include the auxiliary axle and wheel assembly.

The numeral 10 refers generally to a vehicle having a forward end 12 and a rearward end 14. Vehicle 10 is of the "pickup truck" type and has a bed 16 provided at the rearward end thereof adapted to receive a camper 18 thereon having a forward end 20 and a rearward end 22. FIGS. 1 and 2 illustrate the camper 18 as including an auxiliary axle and wheel assembly 24 which is secured to the rearward end of the vehicle and which supports the rearward end of the camper. FIG. 5 illustrates a camper 18' which does not utilize the assembly 24 but is supported entirely by the bed of the vehicle.

The assembly 24 includes a rearwardly extending step 26 having opposite sides 28 and 30. A jack assembly 32 is pivotally connected at its upper end to side 28 and a jack assembly 34 is pivotally connected at its upper end to side 30. The jacks 32 and 34 may be pivoted from the horizontal position seen in FIG. 1 to the vertical position seen in FIG. 2 so that the rear end of the camper may be ground supported and so that the camper may be leveled either on or off the vehicle. Additionally, when the jacks 32 and 34 are pivoted to the horizontal stored position seen in FIG. 1, the shoes 36 and 38 provided on the lower ends thereof are positioned immediately rearwardly of the mud flaps 40 and 42 to prevent the flaps from objectionally flapping in the wind.

The numeral 44 refers generally to the jack and tie-down assembly which is secured to the forward end of the camper. The numeral 46 refers to a jack having a bracket 48 secured to the upper end thereof which is secured to the left side of the camper 18 as illustrated in FIG. 22 by any suitable means such as by bolts or the like extending through the openings 50. Jack 46 includes a hollow sleeve 52 having a leg member 54 vertically movably mounted therein and extending downwardly therefrom as illustrated in FIG. 4. A bolt 56 is threadably secured to the upper end of leg member 54 and is rotatably supported by a plate 58 secured to the sleeve 52. Bolt 56 has a bevel gear 60 at its upper end which is inmesh with a bevel gear 62 mounted on a shaft 64. Shaft 64 extends outwardly through the sleeve 52 and includes a receptacle 66 at its outer end adapated to receive the crank 68 therein to rotate the shaft 64. Rotation of shaft 64 by the crank 68 causes bolt 56 to be rotated which causes the leg member 54 to be raised or lowered with respect to the sleeve 52 depending upon the director of rotation of the bolt 56. The numeral 46' refers to a jack secured to the other side of the camper. Inasmuch as jack 46' is identical to jack 46, only jack 46 is described in detail with "prime mark" indicating identical structure on jack 46'.

The numeral 70 refers generally to a U-shaped support member comprising a horizontal central or base portion 72 having hollow end members 74 and 76 extending upwardly from opposite ends thereof. End member 74 is secured to the lower end of leg member 54 by bolt 78 extending therethrough as illustrated in FIG. 4. Likewise, the end member 76 is secured to the lower end of leg member 54' by bolt 78'. FIG. 3 illustrates the position of support member 70 when the jacks 46 and 46' are in a raised position while the broken lines in FIG. 3 illustrate the relative position of support member 70 when the jacks 46 and 46' have been operated so as to lower the leg members 54 and 54'.

FIG. 2 illustrates the camper 18 having been removed from the truck 10. It can be seen that the jacks 46 and 46' have been lowered so that the horizontal portion 72 of support member 70 engages the ground generally designated by the reference numeral 80. The jacks 32 and 34 have been pivotally moved with respect to the assembly 24 and also engage the ground 80 to support the rear end of the camper. Camper 18 is provided with a great deal of stability in the position of FIG. 2 due to the relationship of the support member 70 with the ground 80 and due to the relationship of the jacks 32 and 34 with the ground 80. The camper 18 may be leveled by simply selectively operating the jacks 32, 34, 46 and 46'. The jacks 46 and 46' can be indepently operated to some extent due to the fact that support member 70 will bend slightly if one of the jacks is operated without operating the other jack.

When it is desired to load the camper 18 on the truck 10, it is simply necessary to back the truck rearwardly through the assembly 44 until the rearward end of the truck engages the assembly 24. The jacks 32, 34, 46 and 46' would then be operated to lower the camper 18 onto the bed of the truck. Jacks 32 and 34 are then operated so that the shoes 36 and 38 move out of engagement with the ground to permit the jacks 32 and 34 to be pivoted to the stored position of FIG. 1 with the shoes 36 and 38 being positioned immediately behind the flaps 40 and 42 respectively to prevent them from objectionally flapping in the wind. Jacks 46 and 46' are then operated so that leg members 54 and 54' are moved upwardly in sleeves 54 and 54' respectively which causes the horizontal portion 72 of support member 70 to engage the underside of the longitudinal frame members of the pickup. The jacks 46 and 46' are operated until the support member 70 tightly engages the frame members thereby limiting upward movement of the front end of the camper 18 with respect to the truck. The engagement of support member 70 with the truck frame positively prevents the camper from bobbing or waving since the frame moves with the vehicle as a unit so that the entire vehicle and camper absorb the bumps together rather than separately. Further, the jacks 46 and 46' provide a roll bar type of protection for the camper as well as a brace protection for the vehicle in case of collision or upset. The tie-down system illustrated in the drawings eliminates the necessity of using turnbuckles or clamp arrangements which must be bolted onto the pickup bed. With the system disclosed herein, there are no holes to drill in the pickup bed and the frame mounting disclosed herein provides a much safer locking device than that previously possible. It can be appreciated that the design of the jacks 46 and 46' eliminates the necessity of removing the shoes from the jacks for storing thereof which is an objectional characteristic of the previously designed campers.

FIG. 5 illustrates a camper 18' which does not utilize the auxiliary assembly 24 at the rearward end thereof. When an assembly 24 is not used, a jack and tie-down assembly 44' is provided on the camper 18' adjacent the rearward end of the camper 18' in the manner illustrated in FIG. 5. Assembly 44' is identical to assembly 44 and engages the frame members of the truck adjacent the rearward end thereof to securely fasten the rear end of the camper 18' to the truck. FIG. 5 illustrates the assembly 44' supporting the rear end of the camper 18' when the camper is removed from the truck.

The jack and tie-down assembly of this invention not only provides an efficient and safe means for securing the camper to the truck but also provides a convenient means for supporting the camper when the camper is removed from the truck. The jacks of the assembly may be operated so as to level the camper to insure that the refrigerator and other equipment in the camper will be level and will function properly. The assembly of this invention permits the camper 18 to be securely fastened to the truck without drilling any holes in the truck or the truck frame. The assembly disclosed herein permits the camper to be rapidly mounted on the truck and rapidly removed therefrom with a minimum of effort. Thus it can be seen that the assembly accomplishes at least all of its stated objectives.

I claim:

1. In a jack and tie-down system for a vehicle mounted camper, comprising,
a first jack means having upper and lower ends and being length adjustable from first to second positions, the upper end of said first jack means being secured to said camper at one side thereof adjacent the forward end thereof,
a second jack means having upper and lower ends and being length adjustable from first to second positions, the upper end of said second jack means being secured to said camper at the other side thereof adjacent the forward end thereof, a support member having first and second ends, said support member being secured at its said one end to the lower end of said first jack means and being secured at its second end to the lower end of said second jack means, said support member extending between said first and second jack means and being adapted to extend beneath the vehicle and to engage the vehicle frame means to tie-down the forward end of the camper to the vehicle when said first and second jack means are in their said first positions, said support member being adapted to engage a supporting surface to support the forward end of the camper when said first and second jack means are moved to their said second positions.

2. The system of claim 1 wherein said first and second jack means and said support member comprise a front jack and tie-down means and wherein a back jack and tie-down means is mounted on the camper rearwardly of the front jack and tie-down means for supporting the back end of the camper and for securing the back end of the camper to the vehicle adjacent the rear end thereof.

3. The system of claim 1 wherein each of said first and second jack means comprise a vertical sleeve member which is rigidly secured to the camper, said sleeve member having a vertically movable pipe member mounted therein, said support member being secured to and extending between lower ends of said vertically movable pipe members.

4. The system of claim 3 wherein said support member comprises an elongated horizontal portion having end portions and the opposite ends thereof which extend upwardly therefrom, said end portions being secured to said vertically movable pipe members.

5. The system of claim 4 wherein said horizontal portion engages the underside of the vehicle longitudinal frame members when said first and second jack means are in their said first position.

6. The system of claim 1 wherein said camper has an auxiliary wheel means at the rearward end thereof which is positioned rearwardly of the rearward end of the vehicle, said auxiliary wheel means having spaced apart jacks secured thereto which are adapted to support the rearward end of the camper when the camper is removed from the vehicle.

* * * * *